United States Patent [19] — [11] 4,179,790

Tornerfelt — [45] Dec. 25, 1979

[54] PROCESS OF MANUFACTURING A WALL HAVING AN OPENING THEREIN, AND A DOOR OR COVER THEREFOR

[75] Inventor: Gösta T. I. Tornerfelt, Ljungby, Sweden

[73] Assignee: AB Trelleborgplast, Ljungby, Sweden

[21] Appl. No.: 915,696

[22] Filed: Jun. 15, 1978

[30] Foreign Application Priority Data

Jun. 23, 1977 [SE] Sweden ................................ 7707315

[51] Int. Cl.[2] ......................... B23P 17/00; B29D 3/02; B29D 9/00; B29G 3/00

[52] U.S. Cl. ......................................... 29/416; 29/460; 49/501; 156/71; 156/250; 264/154; 264/157; 264/258; 264/261; 264/263; 264/328

[58] Field of Search ............. 52/309.9, 309.14, 309.15, 52/309.16; 264/138, 157, 263, 258, 328, 137, 154, 261; 156/79, 92, 242, 250

[56] References Cited

U.S. PATENT DOCUMENTS

| | | | |
|---|---|---|---|
| 2,549,513 | 4/1951 | Nicolle | 156/250 |
| 3,896,589 | 7/1975 | Mitchell | 49/501 |
| 4,080,710 | 3/1978 | Hess | 264/157 |
| 4,126,975 | 11/1978 | Williams | 52/211 |

*Primary Examiner*—W. E. Hoag

*Attorney, Agent, or Firm*—Beveridge, DeGrandi, Kline and Lunsford

[57] ABSTRACT

The invention relates to a process of manufacturing, in one and the same operation, a wall or a wall section having an opening therein, and a door or cover for the opening, the door or cover being larger than the free opening in the wall or wall section.

The two components are formed in a common tool, the components being placed in staggered parallel planes and interconnected by means of a connecting flange which is directed substantially transversely of these planes and extends between the surrounding edge portion of the wall opening and the surrounding edge portion of the door or cover. After forming, the two components are severed by cutting off of the connecting flange, the overlap of the wall or wall section and the door or cover being determined by the thickness of the connecting flange.

7 Claims, 3 Drawing Figures

PROCESS OF MANUFACTURING A WALL HAVING AN OPENING THEREIN, AND A DOOR OR COVER THEREFOR

This invention relates to a process of manufacturing a wall having an opening therein, and a door or cover therefor, which is larger than the opening. In normal cases, the wall element which may be in the form of an entire wall or a wall-like frame detail, and the door or cover are manufactured separately in separate tools. This has been necessary since it usually is required that the door or cover shall overlap, that is the door or cover shall be larger than the free wall opening.

The object of the present invention is to permit manufacture of the door or cover and the wall (or the frame detail) in one and the same tool, the resulting door or cover still being larger than the free opening in the wall (or the frame).

To this end, the invention provides a process comprising forming the wall and the door or cover in a common tool and thereby laterally offsetting them in relation to each other so that they lie in different planes; forming a connecting flange between the surrounding edge portion of the wall opening and the surrounding edge portion of the door or cover, said flange extending substantially transversely of said different planes, and severing the door or cover from the wall by cutting off of the connecting flange.

The invention is applicable to both the forming of simple, solid walls and doors or covers and the forming of a heat-insulated wall or frame detail and a non-insulated or heat-insulated door or cover. When the process according to the invention is utilized for the manufacture of a heat-insulated wall and a preferably heat-insulated door or cover, the wall and preferably also the door or cover being formed by a porous heat-insulation and two solid surface layers which enclose said heat insulation and are united with one another along their edges, the two surface layers should in a further development of the invention be formed in such a way that the opening of the wall and the door or cover will each have a surrounding edge portion within which the two surface layers are united with one another, the edge portions of the wall opening and the door or cover lying in different planes and being united with one another by means of the connecting flange which extends substantially transversely of the planes of the wall and door or cover, and the planes of the wall and door or cover being offset to such an extent that the connecting flange will be accessible from the side.

When both the wall and the door or cover are formed so as to be heat-insulated it is especially preferred according to the present invention to form said edge portions of the wall opening and the door or cover as surrounding outwardly directed flanges and to place said edge portions eccentrically in relation to the inner and outer sides of the wall and the door or cover respectively, the flange of the wall opening being placed closer to the inner side of the wall and the flange of the door or cover being placed closer to the outer side of the door or cover or vice versa to accommodate a sealing strip between the two flanges when the door or cover after cutting off of the connecting flange is mounted in position.

The invention is applicable to all kinds of manufacturing methods with both simple and double tools even though the greatest advantages will be gained by utilizing double tools, that is tools enclosing the two sides of the product. When double tools are utilized it is particularly advantageous in a further development of the invention to cover the two parts of the tool with a glass fibre reinforcement and then close said two parts of the tool about preformed heat-insulating blocks, after which a thermosetting resin is injected into the glass fibre reinforcement to soak said reinforcement altogether and fill out the space between the preformed heat-insulating blocks and the mould parts, whereupon the thermosetting resin is cured.

To avoid unnecessary after-treatment it is most advantageous if the severing of the connecting flange is carried out in a plane substantially parallel with that of the wall and door or cover.

The invention will be described in greater detail hereinbelow with reference to the accompanying drawing in which.

The invention is described in detail in connection with a construction in which both the wall (or frame detail) and the door (or cover) are heat-insulated. As mentioned above, the invention can, however, be utilized both in heat-insulated and non-heat-insulated constructions.

Figure 1:
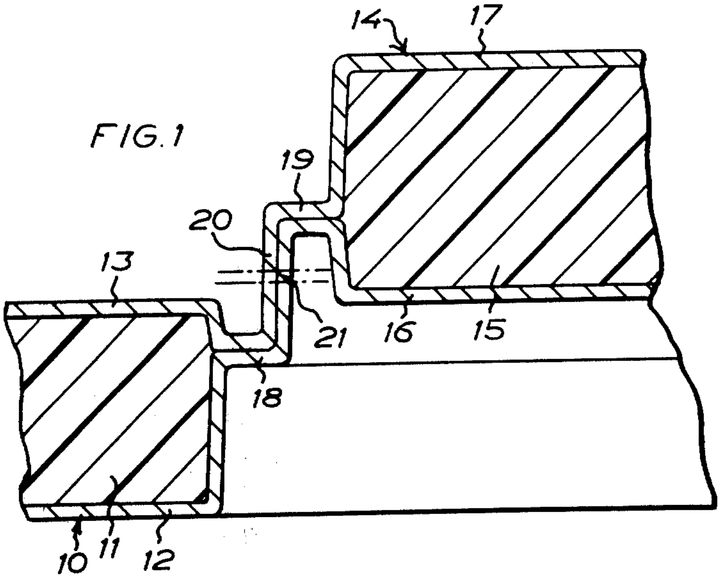
FIG. 1 shows parts of a wall and a door manufactured by the process according to the present invention.

As will be apparent from FIG. 1, a wall 10 has been formed with a heat-insulation 11, a solid outer layer 12 and a solid inner layer 13. Similarly, the door 14 has a heat-insulation 15, a solid outer layer 16 and a solid inner layer 17.

The outer and inner layers of the wall are united with one another within a flange-like surrounding edge portion 18, and the same applies to the outer and inner layers of the door, which are united with one another within a surrounding edge portion 19. The edge portions 18 and 19 are interconnected by means of a connecting flange 20 which like the edge portions 18 and 19 is of double layer thickness. If a greater overlap is desired between the future door or cover and the wall opening the connecting flange 20 can be made still thicker, say with fourfold thickness. In the manufacture the wall and the door are offset to such an extent that the connecting flange 20 will be accessible from the side to permit being cut after the manufacture along a severing cut 21 which is preferably made in parallel with the planes of the wall and the door. After cutting the door is moved over to the opposite side of the wall, as will appear from FIG. 2. As a result, an overlap will be obtained because of the connecting flange 20. For sealing purposes a sealing strip 22 is mounted about the edge portion 19 of the door and the part of the connecting flange 20 thereon.

Figure 3:
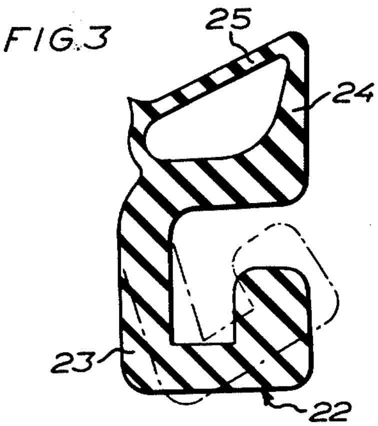
FIG. 3 shows on a larger scale the sealing strip inserted between the wall and the door in FIG. 1.

The sealing strip 22 is preferably formed in the manner which is seen best in FIG. 3, and the sealing strip thus has a hook portion 23 which grasps the edge portion 19 of the door and the part of the connecting flange 20 thereon. The hook portion 23 is then united with a sealing portion 24, which is tubular and has a thin readily deformable wall portion 25 which engages the surrounding edge portion of the wall and the part of the connecting flange 20 thereon. In the manufacture of the sealing strip the hook portion is preferably formed in the manner illustrated by dash and dot lines in FIG. 3 so that the hook portion must be deformed into the shape shown by full lines when mounted on the door.

In the manufacture of the wall and the door according to FIG. 1 the two mould parts of the double tool are first covered with one or more glass fibre layers which are to form reinforcements in the outer and inner layers 12, 16 and 13, 17, respectively. If an extra thick connecting flange 20 is desired, further glass fibre layers are placed on the corresponding parts of the tool. Preformed heat-insulating blocks 11, 15 are then placed in one mould part whereupon the other mould part is mounted in position so that the heat-insulating blocks are enclosed and the glass fibre reinforcements in the inner and outer surface layers are brought into contact with each other within the edge portions 18, 19 and the connecting flange 20. Then a thermosetting resin is injected into the glass fibre reinforcing layers so that these are wholly soaked and so that all space around the heat-insulating blocks 11 and 15 is filled out with thermosetting resin. After hardening the resin the mould is opened and the interconnected door and wall are removed, whereupon the door and wall are severed by being cut at the severing cut 21. Finally, the inner and outer layers of the wall and door are coated with a gelcoat type of surface coat to provide the requisite surface texture.

Figure 2:
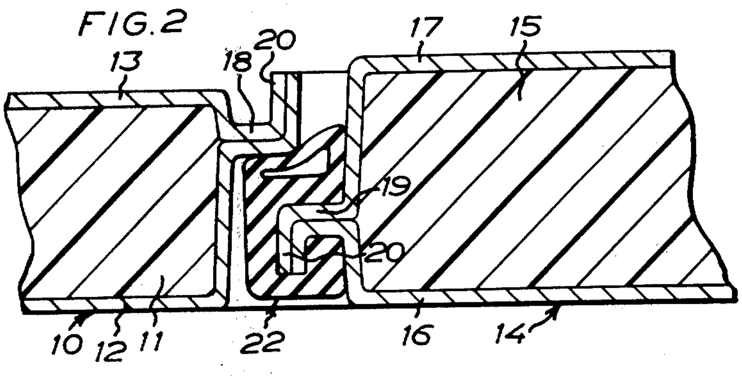
FIG. 2 shows the same parts of the wall and the door after they have been severed and mounted in the contemplated manner.

Then the sealing strip 22 is mounted and the door is moved onto the other side of the wall for mounting in the manner illustrated in FIG. 2.

As will appear from the above description the invention provides a very rational manufacture of wall sections and doors or covers. No waste will result from the wall opening and the circumference of the door or cover, which implies a great advantage.

What I claim and desire to secure by Letters Patent is:

1. A process for making a wall (10) with an opening therein, and a closure (14) for the opening which is larger than the opening, comprising the steps of forming the wall (10) and the closure as one piece in a common tool, said forming step forming the wall and closure in laterally offset relationship so they lie in different planes; forming during said forming step a connecting flange (20) between an inner edge of the wall opening and an outer edge of the closure, said flange extending substantially transversely of said different planes, and severing the closure (14) from the wall (10) by cutting (at 21) intermediate the connecting flange (20).

2. The process of claim 1 in which the closure is uninsulated and the connecting flange is formed with a greater wall thickness than the wall thickness of the closure.

3. The process of claim 1 including the steps of disposing porous heat-insulating material (11) between two solid surface layers (12, 13), at least where said layers correspond to said wall, and uniting said layers along portions separating said wall from said closure, said severing being performed through said layers in said portions separating said wall from said closure.

4. The process of claim 3 including the forming of said connecting flange of a greater wall thickness than the sum of the wall thicknesses of said surface layers.

5. The process of claim 3, wherein the planes of the wall (10) and the closure (14) are laterally offset from each other to such an extent that the connecting flange (20) will be accessible from the side for said severing step.

6. The process of claims 1 or 3 wherein the severing of the connecting flange (20) is performed in a plane (at 21) which is substantially parallel with the plane of the wall (10) or the closure (14).

7. The process of claims 1 or 3 including the step of inserting the severed closure in said wall opening, at an orientation where portions of the severed connecting flange are directed away from each other.

* * * * *

UNITED STATES PATENT AND TRADEMARK OFFICE

CERTIFICATE OF CORRECTION

PATENT NO. : 4,179,790

DATED : December 25, 1979

INVENTOR(S) : Gösta T. I. Tornerefelt

It is certified that error appears in the above—identified patent and that said Letters Patent is hereby corrected as shown below:

On the Title Page Inventor's name should read

-- Gösta T. I. Tornerefelt --.

Signed and Sealed this

*Twenty-seventh* Day of *May 1980*

[SEAL]

*Attest:*

SIDNEY A. DIAMOND

*Attesting Officer* *Commissioner of Patents and Trademarks*